US008977006B2

(12) United States Patent
Guan (10) Patent No.: US 8,977,006 B2
(45) Date of Patent: Mar. 10, 2015

(54) TARGET RECOGNITION SYSTEM AND TARGET RECOGNITION METHOD EXECUTED BY THE TARGET RECOGNITION SYSTEM (71) Applicant: Haike Guan, Kanagawa (JP)

(72) Inventor: Haike Guan, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 49 days.

(21) Appl. No.: 13/905,214

(22) Filed: May 30, 2013

(65) Prior Publication Data
US 2013/0322691 A1 Dec. 5, 2013

(30) Foreign Application Priority Data

Jun. 1, 2012 (JP) .................................. 2012-126416
Apr. 2, 2013 (JP) .................................. 2013-076963

(51) Int. Cl.
*G06K 9/00* (2006.01)
(52) U.S. Cl.
CPC .................................. *G06K 9/00805* (2013.01)
USPC ................ 382/103; 348/169; 701/93; 356/12
(58) Field of Classification Search
USPC ......... 382/100, 103, 154, 181, 190, 195, 199, 382/203, 206, 209; 348/169–172; 356/12; 345/419–427; 707/1, 23, 45, 93, 96
See application file for complete search history.

(56) References Cited

U.S. PATENT DOCUMENTS

| 6,763,125 | B2* | 7/2004 | Ohta .............................. 382/104 |
| 6,906,620 | B2* | 6/2005 | Nakai et al. .................... 340/435 |
| 7,141,796 | B2* | 11/2006 | Hattori et al. ............. 250/370.08 |
| 8,005,266 | B2* | 8/2011 | Saka et al. ..................... 382/104 |
| 8,306,263 | B2* | 11/2012 | Nagaoka et al. .............. 382/103 |
| 8,743,183 | B2* | 6/2014 | Nanri et al. ..................... 348/47 |
| 8,810,653 | B2* | 8/2014 | Nagaoka et al. ............. 348/148 |
| 2003/0137593 | A1* | 7/2003 | Watanabe et al. ............. 348/274 |
| 2005/0169530 | A1* | 8/2005 | Nakai et al. .................... 382/190 |

FOREIGN PATENT DOCUMENTS

| JP | 2008-146549 | 6/2008 |
| JP | 2013-092975 | 5/2013 |

OTHER PUBLICATIONS

Scott Helmer et al: "Using stereo for object recognition",; 2010 IEEE International Conference on Robotics and Automation : ICRA2010:: Anchorage, Alaska, USA, May 3-8, 2010, IEEE, Piscataway, NJ, USA,; May 3, 2010, pp. 3121-3127.

(Continued)

*Primary Examiner* — Anand Bhatnagar
(74) *Attorney, Agent, or Firm* — Harness, Dickey & Pierce, P.L.C.

(57) ABSTRACT

A target recognition system operatively connected to a stereo imaging device to capture a stereo image of an area ahead of the target recognition system, includes a parallax calculator to calculate parallax of the stereo image including two captured images; a target candidate detector to detect a candidate set of recognition target areas based on a luminance image of one of the captured images; and a target recognition processor to limit the candidate set of recognition target areas detected by the target candidate detector within a range of threshold values of characteristics in the candidate set of recognition target areas set in advance based on the parallax calculated by the parallax calculator to extract and output the one or more recognition targets.

4 Claims, 9 Drawing Sheets

(56) References Cited

OTHER PUBLICATIONS

Geronimo D et al: "2D-3D-based on-board pedestrian detection system", Computer Vision and Image Understanding, Academic Press, US, vol. 114, No. 5,; May 1,2010, pp. 583-595.

Alexandros Makris et al: "Integration of visual and depth information for vehicle detection", International Conference on Intelligent Robots and Systems, Workshop on Perception and Navigation for Autonomous Vehicles in Human Environment, Jan. 1, 2011.

Extended European Search Report dated Nov. 4, 2014.

* cited by examiner

☐ : CANDIDATE SET OF RECOGNITION TARGET AREAS

FIG. 12

☐ : CANDIDATE SET OF RECOGNITION TARGET AREAS

FIG. 13

| PARALLAX VALUE | Wmin | Wmax | Hmin | Hmax |
|---|---|---|---|---|
| Δ1 | Wmin_1 | Wmax_1 | Hmin_1 | Hmax_1 |
| Δ2 | Wmin_2 | Wmax_2 | Hmin_2 | Hmax_2 |
| ⋮ | ⋮ | ⋮ | ⋮ | ⋮ |
| Δn | Wmin_n | Wmax_n | Hmin_n | Hmax_n |

TARGET RECOGNITION SYSTEM AND TARGET RECOGNITION METHOD EXECUTED BY THE TARGET RECOGNITION SYSTEM

CROSS-REFERENCE TO RELATED APPLICATIONS

This patent application is based on and claims priority pursuant to 35 U.S.C. §119 to Japanese Patent Application Nos. 2012-126416, filed on Jun. 1, 2012 and 2013-076963, filed on Apr. 2, 2013 in the Japan Patent Office, the entire disclosures of which are hereby incorporated by reference herein.

BACKGROUND

1. Technical Field

The present invention relates to a target recognition system to recognize a recognition target area indicating an oncoming car and pedestrian, and a target recognition method executed by the target recognition system.

2. Related Art

At present, recognition systems, installed in vehicles, which recognize obstacles based on a captured image of the area ahead of the vehicle are widely used for driver support systems such as adaptive cruise control (ACC), to reduce the burden on the driver. The driver support systems provide various functions, including a brake-control-and-alert function that alerts the driver to take corrective action to avoid a collision or reduce the impact of the collision, a driving speed adjustment function to maintain a safe minimum distance between vehicles, and a stray prevention function to prevent the vehicle from straying into another lane.

In JP-2008-146549-A, a driver support system that attempts to alleviate the burden on the driver of the vehicle by recognizing targets based on the image of scenery ahead of the vehicle captured by the imaging devices is disclosed. In order to recognize the targets shown in the captured image, the color and spatial frequency of the target are detected from the captured image. By integrating the detected spatial frequency for generating a distribution of the spatial frequency, the characteristics of the spatial frequency are detected. Then, the recognition target is recognized by comparing the detected target color and spatial frequency characteristics with predetermined target color and spatial frequency characteristics.

In order to implement the driver support system, it is necessary to recognize obstacles in the way of the vehicle accurately and immediately. However, in the above-proposed example, the driver support system also detects various targets other than the road, such as buildings, that are less likely to be obstacles. Since these buildings are not considered obstacles like pedestrians and vehicles, detecting targets other than those on the road comes to nothing. Accordingly, recognizing real obstacles on the road becomes slower.

In addition, the processing time required for detecting and integrating the spatial frequency depends on the memory processing ability and can be lengthy. As a result, the recognition processing to detect the real obstacle when the vehicle is traveling is delayed, which makes it difficult to implement the driver support system suitably. In addition, the above-described driver support system recognizes a false target that is less likely to function as the real obstacle of the recognition target in the background ahead. Therefore, the system may mistakenly recognize background targets as recognition targets.

SUMMARY

In one exemplary embodiment of the present disclosure, there is provided a target recognition system to recognize one or more recognition targets, operatively connected to a stereo imaging device to capture a stereo image of an area ahead of the target recognition system. The target recognition system includes a parallax calculator, a target candidate detector, and a target recognition processor. The parallax calculator calculates parallax of the stereo image including two captured images acquired by the stereo imaging device. The target candidate detector detects a candidate set of recognition target areas based on a luminance image of one of the captured images. The target recognition processor limits the candidate set of recognition target areas detected by the target candidate detector within a range of threshold values of characteristics in the candidate set of recognition target areas set in advance based on the parallax calculated by the parallax calculator to extract and output the one or more recognition targets.

In another aspect of the present disclosure, there is provided a target recognition method executed by the target recognition system that calculates parallax of the stereo image including two captured images acquired by a stereo imaging device; detects a candidate set of recognition target areas based on a luminance image of one of the captured images; limits the candidate set of recognition target areas within a range of threshold values of characteristics in the candidate set of recognition target areas set in advance based on the parallax, and extracts and outputs the one or more recognition targets.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result. Referring now to the drawings, wherein like reference numerals designate identical or corresponding parts throughout the several views thereof, and particularly to FIGS. 1 through 15, a target recognition system according to illustrative embodiments of the present disclosure is described.

Initially, a vehicle-mounted control system includes a target recognition system as in-vehicle system. It is to be noted that the target recognition system according to the present disclosure is not limited to an in-vehicle control system, and thus, for example, the target recognition system may be used for an object detection device that detects the object based on captured images.

Figure 1:
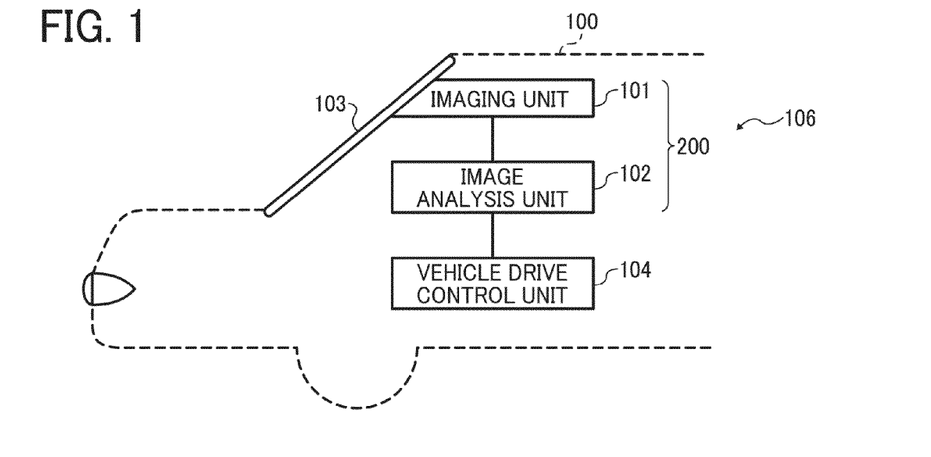
FIG. 1 is a schematic diagram illustrating an in-vehicle control system including a target recognition system, according to the present disclosure.

FIG. 1 is a schematic diagram illustrating an in-vehicle control system 106 including a target recognition system 200 according to the present disclosure. The in-vehicle control system 106 controls the various devices in a vehicle 100 such a car in accordance with recognition of targets using the captured image of the road in front of the vehicle acquired by an imaging unit 101 installed in the vehicle 100.

In FIG. 1, the in-vehicle control system 106 includes the imaging unit 101, an image analysis unit 102, and a vehicle drive control unit 104. The imaging unit 101 is provided as a capture device to capture an image of the area in front of the vehicle 100 in the direction of travel. For example, the imaging unit 101 is provided near a rearview mirror near a windscreen 103 of the vehicle 100. The various data, such as, captured data acquired by the imaging unit 101 is input to the image analysis unit 102 as an image processor. The image analysis unit 102 analyzes the data transmitted from the imaging unit 101, calculates the position, the direction, and the distance of another vehicle in front of the vehicle 100, and detects dividing lines as the lane borders. When another vehicle (leading vehicle, oncoming vehicle) is detected, the another vehicle is detected as the recognition target on the road based on the luminance image In addition, the calculation result of the image analysis unit 102 is transmitted to the vehicle drive control unit 104. The vehicle drive control unit 104 performs driving support control to report the alert and control the steering and brakes of the vehicle 100, based on the detection of the recognition target such as another vehicle and pedestrian. The vehicle drive control unit 104 realizes various functions having a brake-control-and-alert function that the driver is alerted to take corrective action to avoid a collision or reduce the impact of the collision, and a driving speed adjustment function to maintain a safe minimum distance between vehicles by engaging a control device such as the brakes and the steering.

Figure 2:
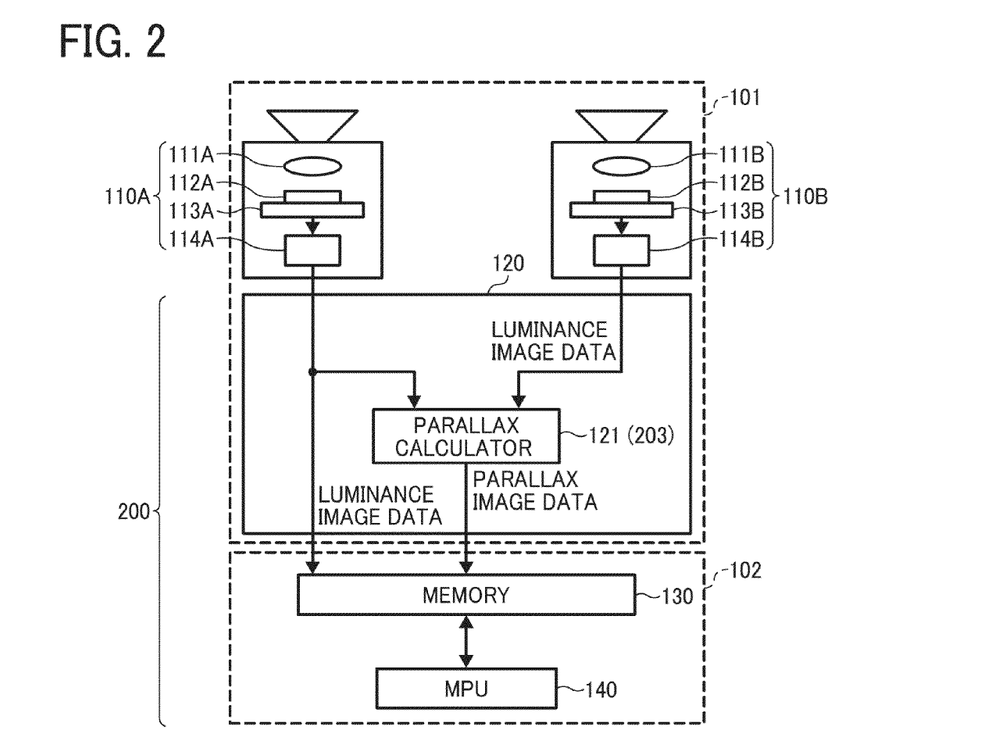
FIG. 2 is a diagram illustrating a configuration of an imaging unit and an image analysis unit shown in FIG. 1.

FIG. 2 is a diagram illustrating a configuration of the imaging unit 101 and the image analysis unit 102. The imaging unit 101 is a stereo camera system that includes two cameras 110A and 110B, and the two cameras 110A and 110B have similar configuration. Respective cameras 110A and 110B include capturing lenses 111A and 111B, optical filters 112A and 112B, and image sensors 113A and 113B on which image pickup elements are two-dimensionally arranged. The imaging unit 101 outputs luminance data.

In addition, the imaging unit 101 includes a process hardware unit 120 constituted by a field programmable-gate array (FPGA). The process hardware unit 120 includes a parallax calculator 121 to calculate parallaxes in the corresponding portions between the captured images, for acquiring the parallax data based on the luminance image data output from the respective imaging units 110A and 110B. Herein, when one captured image acquired by one of the imaging devices 110A and 110B is a reference image and the other captured image acquired by the other of the imaging devices 110A and 110B is a comparison image, the parallax for a certain area is calculated as position deviation in the certain image area in the comparison image correlated to the certain image area in the reference image. Using fundamental of triangulation, the distance from the stereo camera system to the same object corresponding to the certain image area in the captured image areas can be calculated based on the calculated parallax.

The image analysis unit 102 includes a memory 130 and a micro processing unit (MPU) 140. The memory 130 stores luminance image data and parallax image data output from the imaging unit 101. The MPU 140 performs recognition processing to recognize targets and controls the parallax calculation, using the luminance image data, and parallax image data stored in the memory 130.

Figure 3:
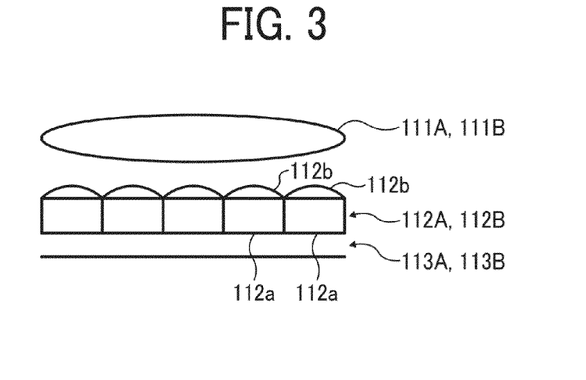
FIG. 3 is a schematic expanded view illustrating optical filters shown in FIG. 2 viewed from a direction orthogonal to an optical transmission direction.

FIG. 3 is a schematic expanded view illustrating the optical filters 112A and 112B and the image sensors 113A and 113B viewed from a direction orthogonal to an optical transmission direction. Each of the image sensors 113A and 113B is constituted by, such as, charge coupled device (CCD) and Complementary Metal Oxide Semiconductor (CMOS), and the imaging element (light-receiving element) is formed by photodiodes 113a. The photodiodes 113a are two dimensionally arranged for each of the imaging pixels in the image sensors 113A and 113B. In order to improve the focus efficiency, a micro lens 113b is provided on the incoming side of the photodiodes 113a. By connecting the image sensors 113A and 113B by printed wiring board (PWB) bonded by wire boding method, sensor substrates 114A and 114B are formed.

Figure 4:
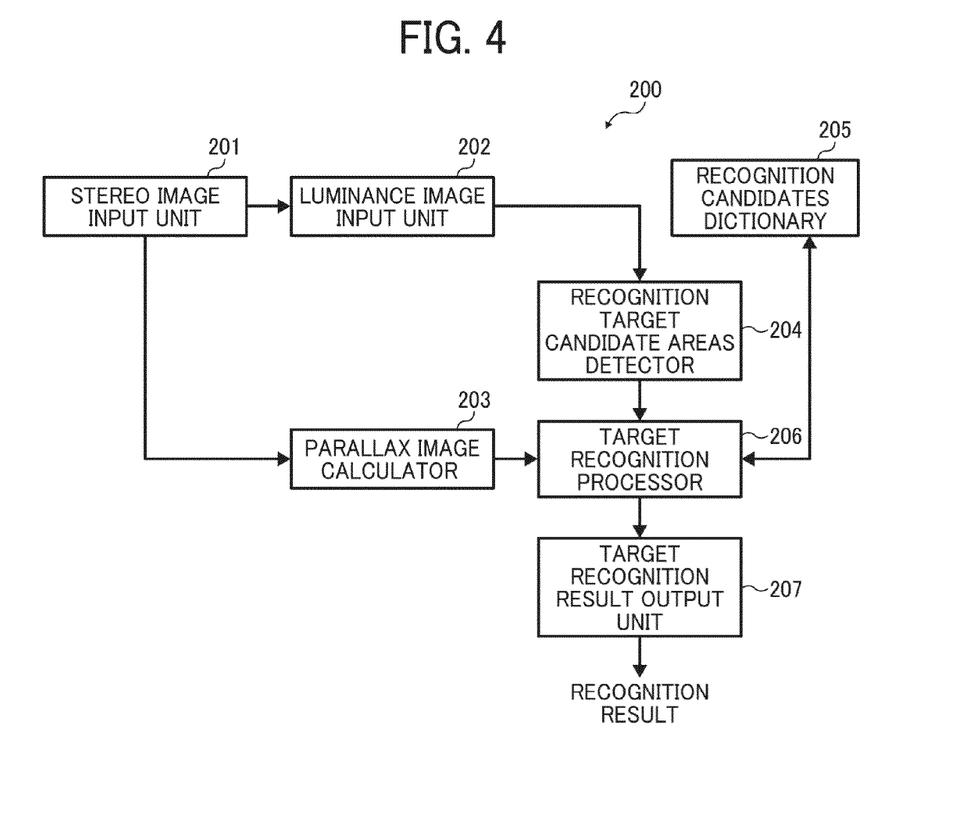
FIG. 4 is a block diagram illustrating a configuration of the target recognition system.

Next, a recognition process according to a feature of the present disclosure is described below. FIG. 4 is a block diagram illustrating a configuration of a target recognition system 200. In FIG. 4, the target recognition system 200 includes a stereo image input unit 201, a luminance image input unit 202, a parallax image calculator 203, a recognition target candidate detector 204, a recognition candidate dictionary 205, a target recognition processor 206, and a target recognition result output unit 207. The stereo image input unit 201 receives the stereo image from the stereo camera including imaging units 110A and 110B containing imaging lenses and image sensors positioned on both sides of the stereo camera.

The luminance image input unit 202 receives the luminance image of right image or left image of the stereo image from the stereo image input unit 201. The input stereo image and the luminance image are stored in the memory 130 in the stereo camera system. The parallax image calculator 203 calculates the parallax (parallax image) of the captured targets that is the difference of the focusing position between the right image and left image. The recognition target candidate area detector 204 detects a candidate set of recognition target areas presenting forward corners of the captured image showing the area ahead of the vehicle 100. The recognition candidate dictionary 205 is generated by a machine learning method, such as Support Vector Machine (SVM) method, using the image sample learning data of the target recognition in advance. The recognition candidate dictionary 205 is formed for each of recognition targets. The target recognition processor 206 performs the recognition processing. The target recognition processor 206 uses the recognition candidate dictionary 205 to recognize the recognition targets. The target detection result output unit 207 outputs the recognition result of the recognition targets.

Herein, the recognition process in the target recognition processor 206 is described below. Initially, the target recognition processor 206 calculates a parallax average of the candidate set of recognition target areas. The parallax average is the value obtained by adding the parallaxes at certain pixels and then dividing the sum, or obtained by using a central value (median) filter in the candidate set of recognition target areas. Alternatively, the parallax may be set to the highest frequency value within the recognition target candidate areas. The target recognition processor 206 calculates the distance between the candidate set of recognition target areas and the stereo camera system 101 based on the parallax average. The target recognition processor 206 calculates the size of the real candidate set of recognition target areas using the distance from the stereo camera system 101 and sizes of the recognition target candidate areas on the captured image.

When horizontal, vertical sizes of the candidate set of recognition target areas exceed a size threshold range setting as the predetermined recognition targets, the recognition is considered as falsely recognition, and the excess candidate set of recognition target areas are eliminated. Then, the recognition target contained within the size threshold range of the candidate set of recognition target areas is output as the target recognition result.

With these processes, the accuracy of the candidate set of recognition target areas can be improved. Herein, the size threshold range is saved in the memory 130 of the stereo camera 101.

Figure 5:
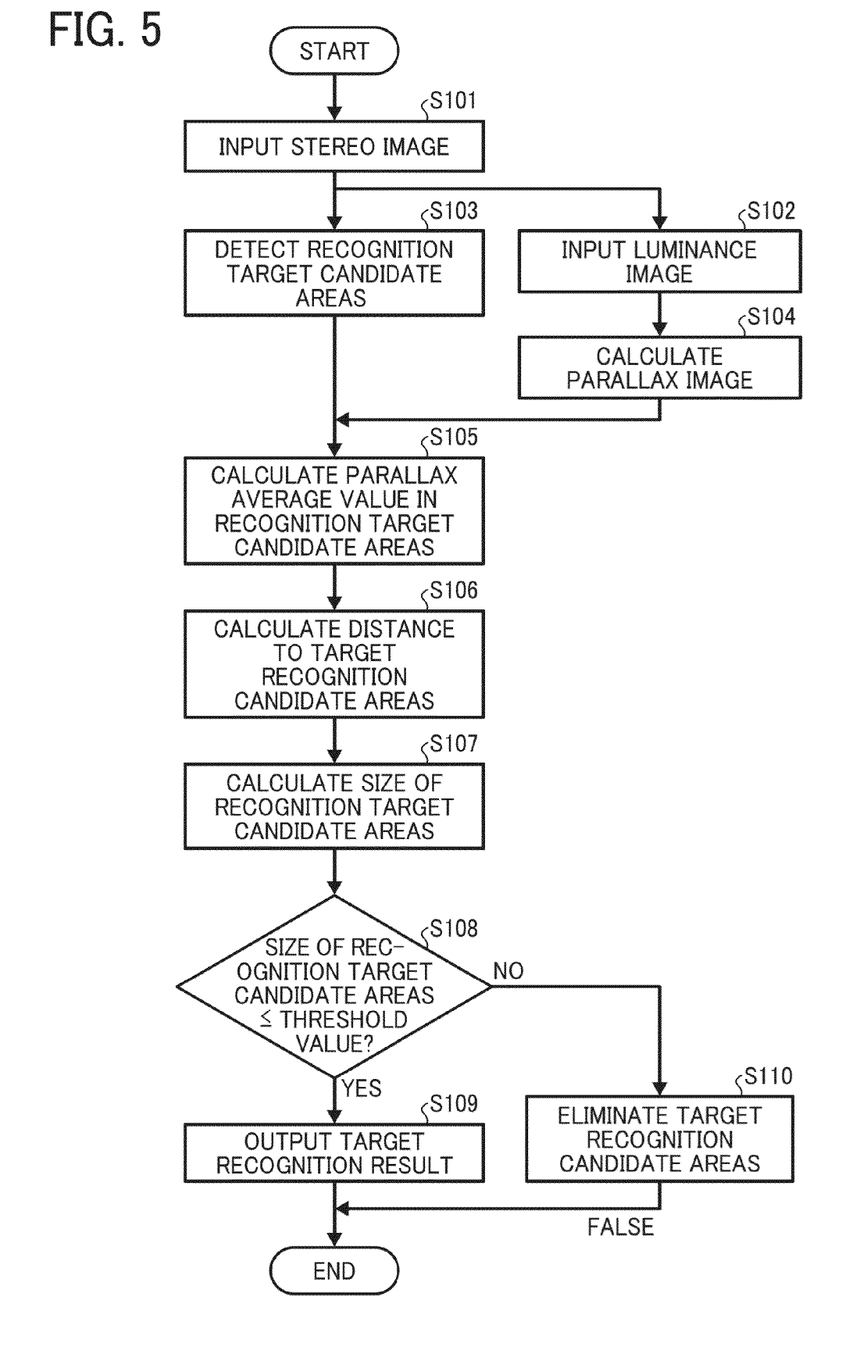
FIG. 5 is a flow chart illustrating target recognition process executed by the target recognition system.
Figure 6:
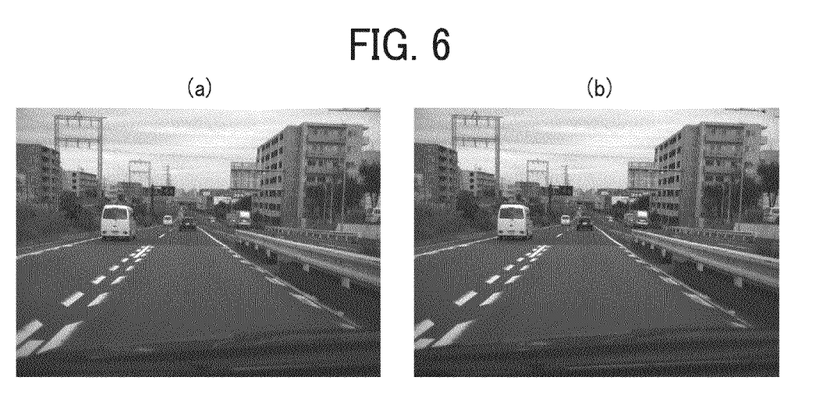
FIG. 6 is one example of a stereo image.

Next, operation flow of the target recognition system 200 is described below with reference to FIG. 5. FIG. 5 is a flow chart illustrating target recognition process executed by the target recognition system 200. At step S101, the stereo image is input to the stereo image input unit 201 (see FIG. 4). More specifically, the stereo image is input from stereo camera 201. FIG. 6 is one example of a stereo image. The same subject in the stereo image is positioned at different imaging positions in the right image and the left image.

Then, the luminance image input unit 202 outputs luminance image of left image or right image at step S102. The input stereo image and the luminance image are saved in the memory 516 in the stereo camera 102.

The parallax image calculator 203 calculates the parallax that is a difference between the image forming positions of the left image and right image in the object of the stereo image, using the stereo image input from the stereo image input unit 201 at step S103. More specifically, the parallax image where the parallax is treated as the pixel value is calculated based on the same areas between the left image and the right image formed by the left image lens 111A and right image lens 111B, using block matching method.

The block matching method is the method to divide the left image and the right image into multiple blocks and calculate the parallax based on the blocks where the degree of similarity between the left image and the right image is largest in the blocks and blocks between the left image and the right image is matched. For example, the image having 1280×960 pixels is divided into 5×5 pixel-size blocks. Then, the parallax is calculated using the respective blocks. The optimum values of the block sizes are set by adjusting through the experiment.

Figure 7:
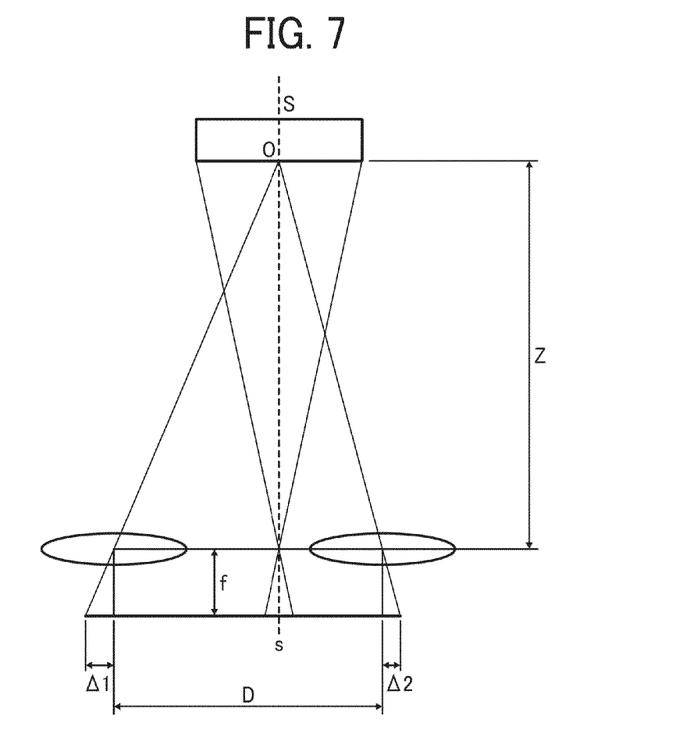
FIG. 7 is a fundamental view illustrating a range finding in the stereo camera shown in FIG. 1.

In one example illustrated in FIG. 7, $\Delta 1$ and $\Delta 2$ represent distances from image center positions to actual image positions in the right image and the left image showing a point O in the capturing target. Accordingly, the parallax $\Delta$ can be obtained by adding the distance $\Delta 1$ and the distance $\Delta 2$ ($\Delta = \Delta 1 + \Delta 2$). The parallax image has parallaxes in the corresponding pixel positions.

The recognition target candidate area detector 204 detects a candidate set of recognition target areas such as vehicle and pedestrian, using the luminance image input from the luminance image input unit 202 at step S104. The target recognition processor 206 calculates the parallax average of the candidate set of recognition target areas recognized from the luminance image at step S105. The target recognition processor 206 calculates the distance between the candidate set of recognition target areas and the stereo camera from the parallax average at step S106. The target recognition processor 206 calculates the actual size of the candidate set of recognition target areas r using the distance from the stereo camera and the size of the candidate set of recognition target areas on the image at step S107.

The target recognition processor 206 compares the actual size of the candidate set of recognition target areas with the size threshold range corresponding to the candidate set of recognition target areas at step S108. When the actual size of the candidate set of recognition target areas is positioned within the size threshold range (Yes at step S108), the target recognition processor 206 executes the recognition processing using the luminance image, and output the target recognition results at step S109. When the actual size of the candidate set of recognition target areas positioned outside of the size threshold range (No at step S108), the target recognition processor 206 executes the recognition processing to eliminate the excess image, and recognize the excess candidate set of recognition target areas as the false detection at step S110.

Figure 8:
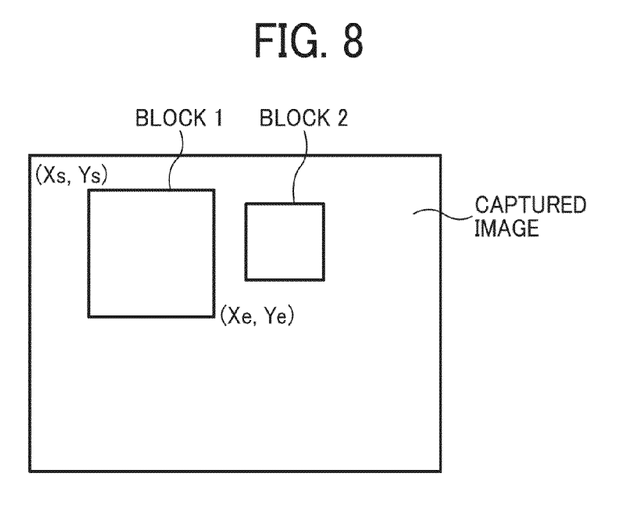
FIG. 8 is the image including multiple rectangular blocks.

Herein, the detail recognition process to recognize the recognition target according to the present disclosure is described below. Initially, in order to recognize the recognition target, as illustrated in FIG. 8, rectangular or square blocks are set associated with target images in the captured image. The position and the size of the rectangular block in the captured image are determined by an upper left coordinate (Xs, Ys) and a lower right coordinate (Xe, Ye) of the rectangular. Then, using a large rectangular block 1, the captured images is scanned, and the target image is extracted so that the size of the rectangular block 1 almost matches the size of the target, and the rectangular blocks 1 is set for the extracted target images.

After setting the rectangular block 1, using a small rectangular block 2, the captured images is scanned, and then, the target image is extracted so that the size of the rectangular block 2 almost matches the size of the small target, and the rectangular block 2 is set for the extracted small target image. Accordingly, the rectangular blocks are set for the corresponding target images. The rectangular block is associated to the candidate set of recognition target areas.

Then, the target recognition processor 206 recognizes the recognition targets, using the recognition candidate dictionary 205. Herein, the recognition candidate dictionary 205 for recognizing the aimed recognition target is described below.

Figure 9A:
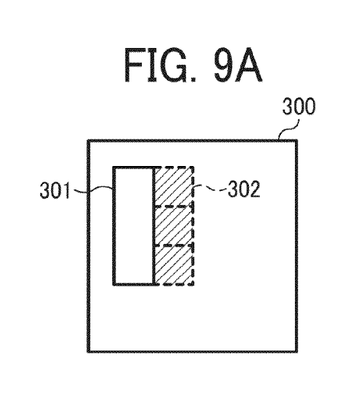
FIGS. 9A through 9D illustrate examples of feature patterns in the rectangular block.
Figure 9B:
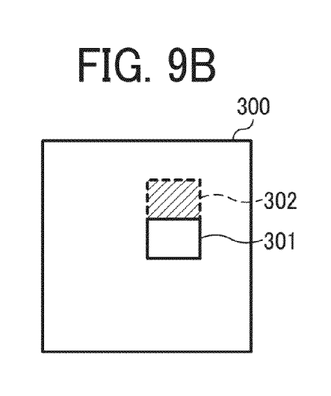
Figure 9C:
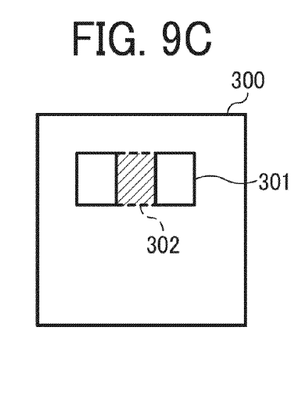
Figure 9D:
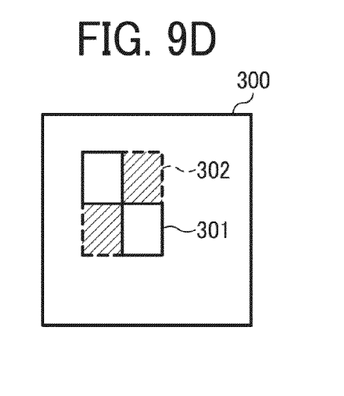

As illustrated in FIGS. 9A through 9D, the target recognition processor 206 calculates feature amount in a rectangular block of an evaluation target, based on a rectangular range 401 constituted by only white pixels and a rectangular range 402 constituted by only black pixels, represented by a shaded portion contained in a rectangular block 300 shown in FIG. 9A. The target recognition processor 206 calculates a difference between the pixels in the evaluation target rectangular block and the white pixels of the rectangular range 401 and between the pixels in the evaluation target rectangular block and the black pixel value of the rectangular block 402, and therefore, the difference in the sums are set as the feature amount h(x) in the rectangular block 300.

The feature patterns A, B, C, and D shown in FIGS. 9A through 9D almost fully cover features of ant targets. In the feature pattern A, the rectangular range 301 and the rectangular range 302 are positioned adjacent from side to side, and both ranges are positioned upper left from the center of the rectangular block 300. In the feature pattern B, the rectangular range 301 and the rectangular range 302 are positioned adjacent up and down, and both ranges are positioned upper left from the center of the rectangular block 300. In the feature pattern C, the rectangular range 302 is sandwiched between two rectangular ranges 301, and both ranges are positioned upper from the center of the rectangular block 300. In the feature pattern D, the rectangular range 301 and the rectangular range 302 are positioned diagonally, and both ranges are positioned left side from the center of the rectangular block 300.

Then, using the evaluation function like that shown in the formula 1, evaluation weight values f(x) in the candidate sets of recognition target areas are calculated based on an evaluation function like that shown in the formula 1. By calculating the feature amount $h_t(x)$ in the entire pixels T in the rectangular blocks t (1 to T) (T; the number of patterns used for evaluation), the weight evaluation value f(x) is calculated by integrating weight coefficients $\alpha_t$ attached to each of the rectangular blocks.

Herein, the feature amount $h_t(x)$ and the weight coefficient $\alpha_t$ are obtained by collecting learning data for the image of the recognition target and by leveraging the learning data. By calculating the weight evaluation values for the above-described feature patterns A through D, the recognition candidate dictionary 205 saves pairs of the feature pattern and weight coefficient based on the calculated weight evaluation values $$f(x) = \sum_{t=1}^{T} \alpha_t h_t(x) \quad (1)$$

Figure 10:
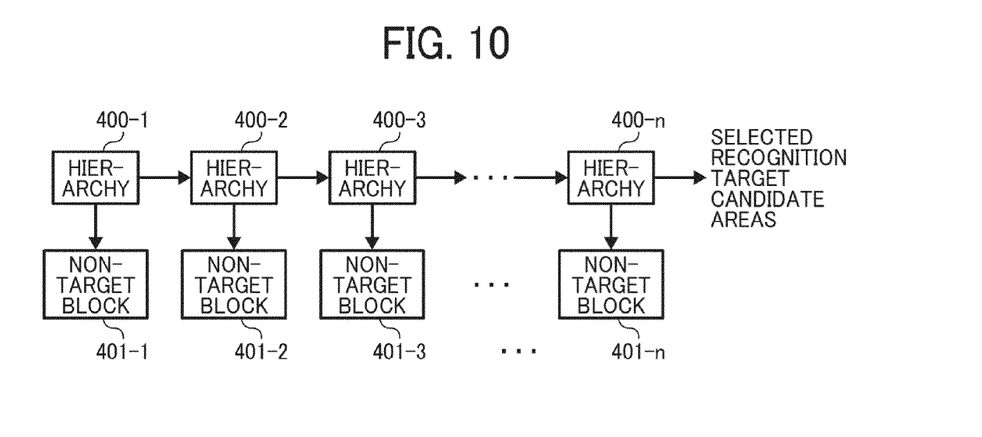
FIG. 10 is a diagram illustrating a configuration of the target recognition processor including hierarchies.

Herein, the target recognition processor 206 includes multiple hierarchies 400-1 through 400-n (n; natural integer number). In the respective hierarchies 400-1 through 400-n, the target is evaluated using the weight evaluation values of the evaluation function represented by the formula (1).

In the respective hierarchies 400-1 through 400-n, using a unique feature pattern for each of recognition targets or multiple feature patterns for each of recognition targets and weight coefficients associated to the feature pattern(s), the evaluation is performed based on the formula (1). In general, the huaraches vary from 400-1 to 400-n, the number of used patterns is gradually increased. Accordingly, recognition speed can becomes faster. For example, when the rectangular block that is smaller than the threshold range set in advance, in the hierarchy 400-1, the aimed recognition target is not present in the rectangular block is determined. Then, without evaluating the rectangular block, the block is handled as a non-target block 400-1. Similar determination is performed for respective hierarchies 400-2 to 400-n (n: natural integer). The rectangular block, in which the recognition target in the final hierarchy 400-n is not the recognition target, is not determined as the rectangular block in which the image of the aimed recognition target is present.

When the feature amount is calculated, the recognition weight is additionally multiplied. Therefore, when the recognition weight in the road area is set to 1 and the recognition weight in the other area is set to 0; that is, when the weight coefficient of the entire area other than the road area is 0, the recognition process is performed for the road area and is not performed for the areas other than the road area. Alternatively, the weight coefficient corresponding to the recognition weight is set at decimal, and the different weight coefficients may be set for the respective areas. In this case, even when the aimed recognition target is present in the respective area whose weight coefficient is set at a small value and the area whose weight coefficient is set at a larger value, the weight evaluation value in the area whose weight coefficient is small is small, that is not the image of the recognition target is determined.

Accordingly, the recognition results of the recognition target in the area whose weight coefficient is small is bad, and the image of the target similar to the image of the recognition target can be eliminated, thereby reducing the generation of false recognition.

Figure 11:
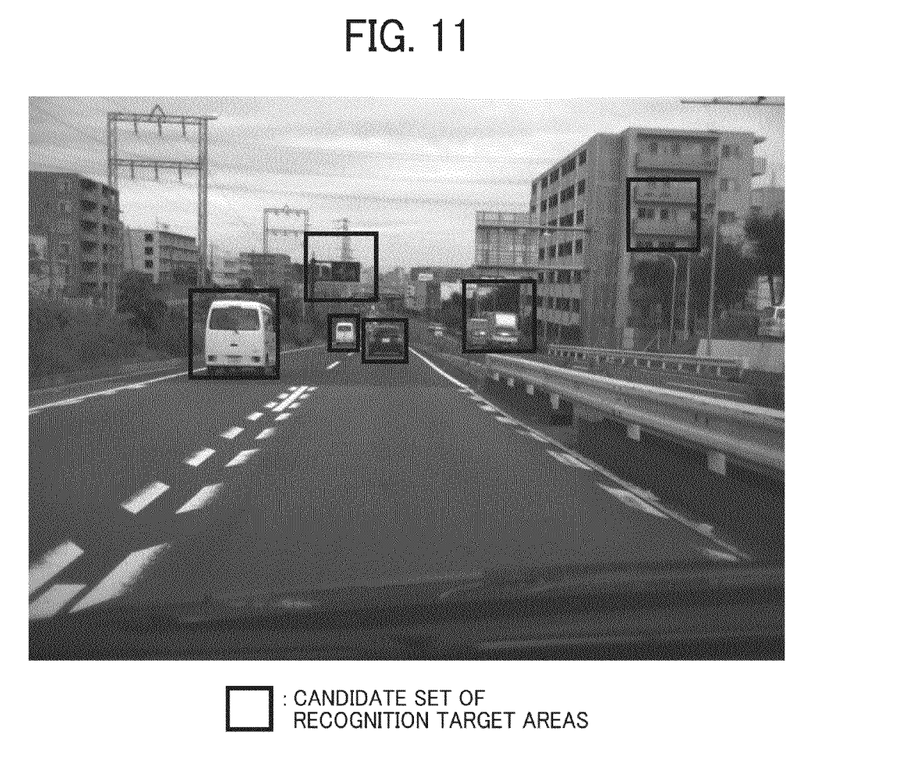
FIG. 11 is one example of a captured image including detected candidate set of recognition target areas.
Figure 12:
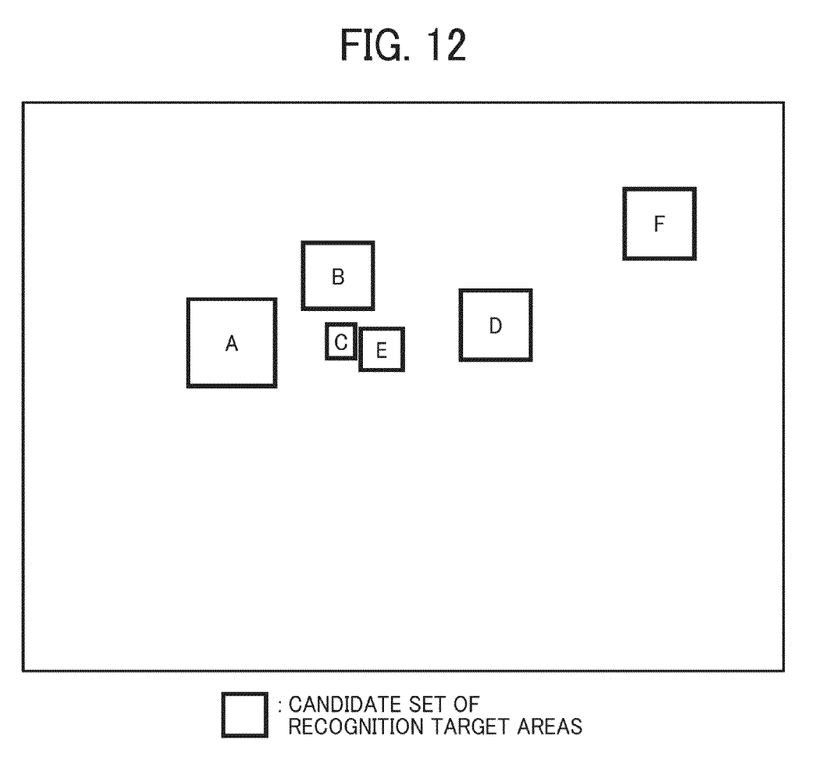
FIG. 12 is one example of an image including detected candidate set of recognition target areas.

Herein, the feature amount, the weight coefficient, and the evaluation threshold value for calculating the evaluation values of the respective hierarchies in the target recognition processor 206 are acquired by using a leaned image that classifies recognition targets and un-recognition targets. FIGS. 11 and 12 illustrate the detected candidate set of recognition target areas in the image. In FIGS. 11 and 12, the areas enclosed by bold lines represent the candidate set of recognition target areas Then, the target recognition processor 206 eliminates the falsely detected candidate set of recognition target areas from the candidate set of recognition target areas detected by the recognition target candidate area detector 204, using the parallax image containing the parallaxes calculated by the parallax image calculator 203. At this time, the target recognition processor 206 calculates the parallax average of the candidate set of recognition target areas recognized from the luminance image.

Then, the target recognition processor 206 calculates the distance of the candidate set of recognition target areas from the stereo camera based on the parallax average. More specifically, the relation between a parallax average $\Delta$ and a distance Z of the candidate set of recognition target areas from the stereo camera are represented by the following formula 2 (see FIG. 7).

$$\Delta : f = D : Z \quad (2)$$

In the formula 2, f represents a focal length between the two imaging lenses 111A and 111B in the stereo camera system, D represent a difference between the two camases. Therefore, the distance Z of the candidate set of recognition target areas from the stereo camera can be calculated by the following formula 3.

$$Z = D \times f / \Delta \quad (3)$$

After the distance Z of the candidate set of recognition target areas from the stereo camera is calculated, an actual size of the candidate set of recognition target areas can be calculated. Herein, the relation between a virtual size s of the candidate set of recognition target areas in the captured image and the actual size S of the candidate set of recognition target areas is represented by the following formula 4.

$$S:Z=s:f \quad (4)$$

Therefore, the actual size S of the candidate set of recognition target areas can be calculated by the following formula 5.

$$S=s \times Z/f \quad (5)$$

By comparing the size recognition range corresponding to the candidate set of recognition target areas, and the actual size S of the candidate set of recognition target areas acquired by the formula 5, the falsely detected candidate set of recognition target areas can be eliminated from list of the candidate set of recognition target areas.

Figure 13:
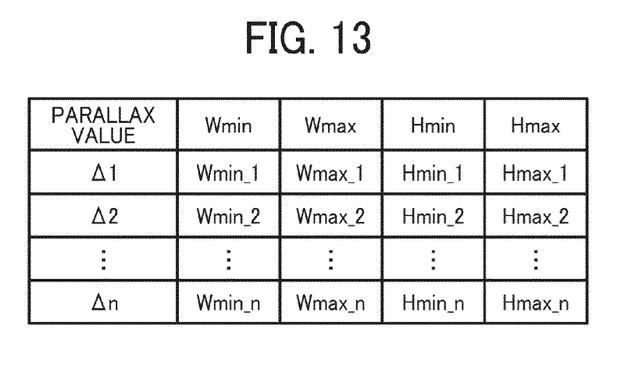
FIG. 13 is a table representing width minimum, width maxim, height minimum, and height maxim of the recognition target relative to parallax average value.

For example, width minimum Wmin, width maxim Wmax, height minimum Hmin, and height maxim Hmax of the candidate set of recognition target areas can be set as following values. When the recognition target is pedestrian, the size threshold range can be set at a range whose height minimum Hmin is 0.5 m, height maxim Hmax is 2.5 m, width minimum Wmin is 0.1 m, and width maxim Wmax is 1.0 m. When the recognition target is the car an, the size threshold range can be set at a range whose height minimum Hmin is 1.0 m, height maxim Hmax is 5.0 m, width minimum Wmin is 4.0 m, and width maxim Wmax is 3.0 m. Then, whether or not the candidate set of recognition target areas is falsely detected or not is determined based on the range of the Wmin, Wmax, Hmin, and Hmax. That is, the width Ws and the height Hs of the candidate set of recognition target areas can be set within the range represented by the formulas 6 and 7.

$$W\text{min} < Ws < W\text{max} \quad (6)$$

$$H\text{min} < Hs < H\text{max} \quad (7)$$

The values of the Wmin, Wmax, Hmin, and Hmax of the respective candidate set of recognition target areas can be determined by actually collected experiment data of the recognition target.

In this configuration, when the detected candidate set of recognition target areas is positioned either excess width area (6) or excess height area (7), the recognition processor 206 detects that the candidate set of recognition target areas is falsely detected. Alternatively, when the detected candidate set of recognition target areas is positioned the excess width area (6) and the excess height area (7), the recognition processor 206 detects that the candidate set of recognition target areas is falsely detected.

Using theses calculation, the rectangular blocks B, D, and F shown in FIG. 12 is detected as the false result of the candidate set of recognition target areas to be eliminated.

Figure 14:
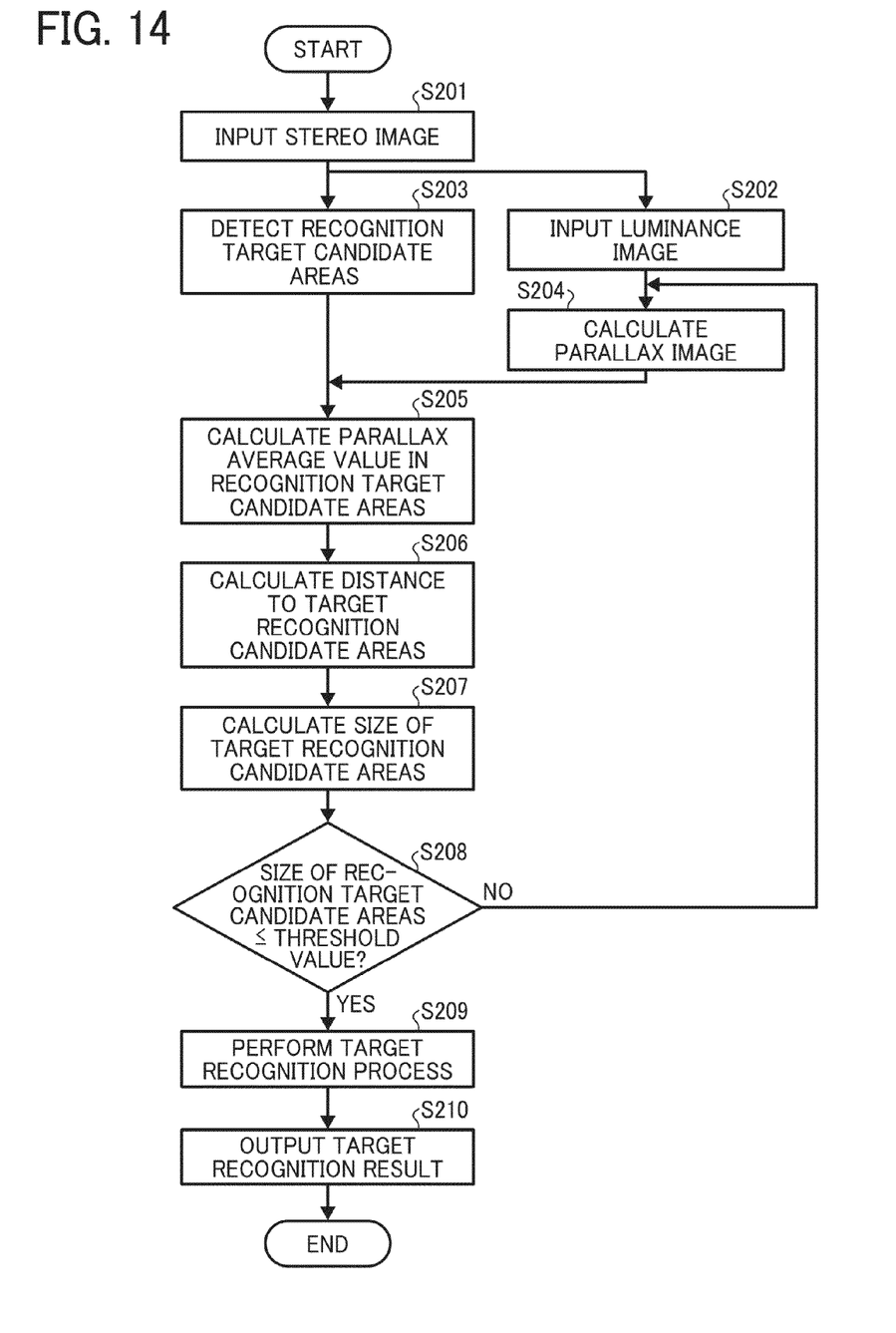
FIG. 14 is a flow chart illustrating another target recognition process executed by the target recognition system.

FIG. 14 is a flow chart illustrating another target recognition process executed by the target recognition system 200. The steps S201 through S207 in the target recognition operation shown in FIG. 14 are similar to the steps S101 through S107 shown in FIG. 5.

What is different from FIG. 5 is described below. At step S208, the target recognition processor 206 compares the size threshold range corresponding to the candidate set of recognition target areas with the actual size of the candidate set of recognition target areas. When the actual size of the candidate set of recognition target areas is equal to or smaller than the size threshold range (Yes at step S208), the target recognition processor 206 performs the recognition process using the luminance image, and outputs the target recognition results at step S209 and S210.

Conversely, when the actual size of the candidate set of recognition target areas is larger than the size threshold range (No at step S208), the target recognition processor 206 determines that the detected target is not the recognition target without performing the recognition process and process is revisited to the parallax calculation process step S204, and detects the candidate set of recognition target areas again at the following steps. With these processing, the false recognition can be further reduced.

Figure 15:
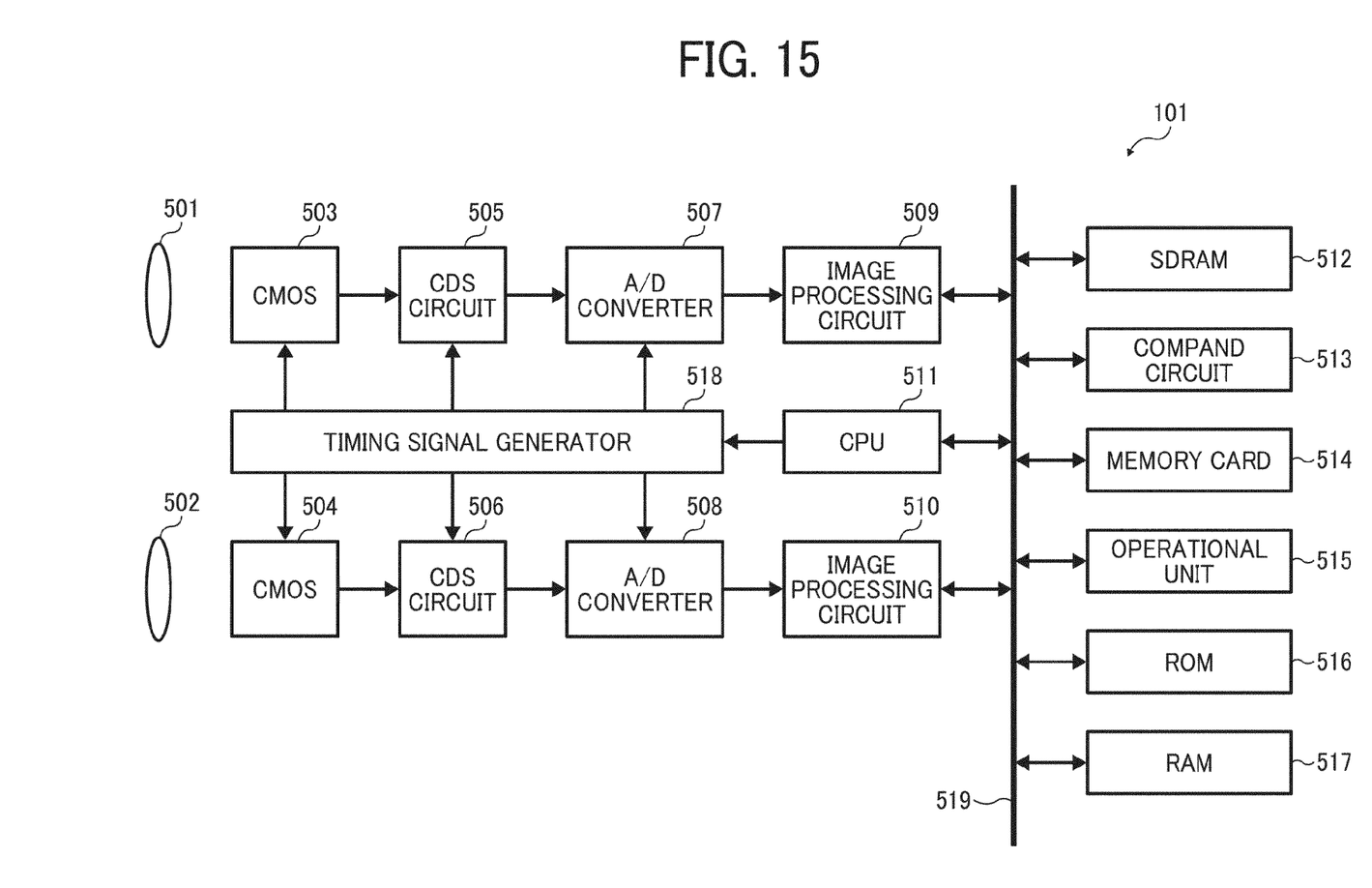
FIG. 15 is a block diagram illustrating a hardware configuration of the stereo camera system.

A hardware configuration of the in-vehicle stereo camera imaging device to recognize the recognition target is described below with reference to FIG. 15. FIG. 15 is a block diagram illustrating one example of a hardware configuration of the stereo camera. In FIG. 15, a light reflected from the object is input to Complementary Metal Oxide Semiconductors (CMOS) 503 and 504 corresponding to the image sensors 112A and 112B (see FIG. 4) through the both imaging lenses 501 and 502 (112A and 112B) in the stereo camera. The CMOS 503 and 504 convert the optical image formed on the captured image into electrical signals for outputting as analog image data. Then, signal processor 114A and 114B include correlated double sampling (CDS) circuits 505 and 506, analog-digital (A/D) converters 507 and 508, and image processing circuits 509 and 510. Each of the process hardware unit 120 and the MPU 140 includes a central processing unit (CPU) 511, a synchronous dynamic random access memory (DRAM) 512, a compand (compress-expand) circuit 513, a read only memory (ROM) 516, random access memory (RAM) 517, and a timing signal generator circuit 518. Noise of the analog image data output from the CMOS 503 and 504 is removed by the CDS circuits 505 and 506, and the noise-removed image data is converted into digital signal, by the A/D converters 507 and 508, for outputting to the image processing circuits 509 and 510.

Using the SDRAM 512 that temporarily saves the image data, the image processing circuits 509 and 510 performs various image processing, such as luminance-hue (YcrCb) conversion, white balance control processing, contrast correction processing, and edge emphasis processing. In the processes of image processing, shade of the image information is adjusted in the white balance processing, contrast of the image information is adjusted in the contrast correction processing, sharpness of the image information is adjusted in the edge emphasis processing, and color of the image information is adjusted in the color conversion processing.

In addition, the image information in which the signal process and image process is executed is memorized in the memory card 514 via the compand circuit 513. The compand circuit 513 compresses the image information output from the image processing circuits 509 and 510 and expands the image information read from the memory card 514, to output the compressed and expanded information to the image processing circuit. The timings of the CMOS 503 and 504, the CDS circuits 505 and 506, and the A/D converters 507 and 508 are controlled by the CPU 511 via the timing signal generator 518 that generates the timing signal. Furthermore, the CPU 511 further controls the image processing circuits 509 and 510, the compand circuit 513, and the memory card 514.

In the stereo camera system, the CPU 511 performs various calculations depending on the target recognition program. The CPU 511 installs ROM 516 dedicated for storing the image processing program and RAM 517 that is a readably memory including a work area used for the various processes and various data storage area. The ROM 516 and RAM 517 are connected by a bus line 519. With this configuration, the stereo camera is constituted by module configuration including the process function to perform parallax calculation executed in the in-vehicle stereo camera system, to detect the candidate set of recognition target areas using the luminance image, perform the target recognition function to eliminate the false detection of the candidate set of recognition target areas As the actual hardware configuration, the CPU 511 reads out the image processing program from the ROM 516, and the respective process are road on the main memory and the target recognition result is output.

Herein, the present invention of the present disclosure can provide, in addition to the target recognition system and the target recognition method described above, a computer readable program for executing the method. The computer program to be executed by the target recognition system according to the present embodiment can be provided by being recorded in a computer-readable recording medium such as a CD-ROM, an FD, a CD-R, and a DVD as a file in an installable format or an executable format.

Alternatively, the computer program to be executed by the target recognition system according to the present embodiment can be provided by being downloaded by a predetermined transmission device over a transmission medium, such as telephone line, dedicated network, Internet, and other communication systems. Herein, while transmitting the program, at least a part of computer program should be transmitted through the transmission medium. That is, not all of data constituting the computer program should be present in the communication medium (signal) at one time. The communication medium (signal) is implemented by a carrier wave of a computer data signal containing the computer program. A communication method to transmit the computer program from the predetermined transmission device may contain a continuous transmission process to transmit the data constituting the computer program and an intermittent transmission process.

Numerous additional modifications and variations are possible in light of the above teachings. It is therefore to be understood that, within the scope of the appended claims, the disclosure of this patent specification may be practiced otherwise than as specifically described herein.

What is claimed is:

1. A target recognition system to recognize one or more recognition targets, operatively connected to a stereo imaging device to capture a stereo image of an area ahead of the target recognition system, the target recognition system comprising:

a parallax calculator to calculate parallax of the stereo image including two captured images acquired by the stereo imaging device;

a target candidate detector to detect a candidate set of recognition target areas, based on a luminance image of one of the captured images; and a target recognition processor to limit the candidate set of recognition target areas detected by the target candidate detector within a range of threshold values of characteristics in the candidate set of recognition target areas set in advance based on the parallax calculated by the parallax calculator to extract and output the one or more recognition targets.

2. The target recognition system according to claim 1, wherein the target recognition processor is configured to:

calculate an average of the parallax of the candidate set of recognition target areas detected by the target candidate detector based on the parallax calculated by the parallax calculator;

calculate distances from the stereo imaging device to the candidate set of recognition target areas detected by the target candidate detector, using the calculated parallax average;

calculate sizes of the candidate set of recognition target areas, using the calculated parallax average and the distance from the stereo imaging device; and extract and output one or more recognition targets from the candidate set of recognition target areas detected by the target candidate detector, so that actual sizes of the extracted candidate set of recognition target areas depending on the calculated distance area are limited within a range of the threshold values of the characteristics in the candidate set of recognition target areas set in advance.

3. The target recognition method according to claim 1, further comprising:

calculating an average of the parallax of the candidate set of recognition target areas based on the calculated parallax;

calculating distances from the stereo imaging device to the candidate set of recognition target areas, using the calculated parallax average;

calculating sizes of the candidate set of recognition target areas, using calculated parallax average and the distance from the stereo imaging device; and extracting and outputting the one or more recognition targets from the candidate set of recognition target areas, so that actual sizes of the extracted candidate set of recognition target areas depending on the calculated distance area limited within a range of the threshold values of the characteristics in the candidate set of recognition target areas set in advance.

4. A target recognition method executed by a target recognition system to recognize one or more recognition targets, operatively connected to a stereo imaging device to capture a stereo image of an area ahead of the target recognition system, the method comprising the steps of:

calculating parallax of the stereo image including two captured images acquired by the stereo imaging device;

detecting a candidate set of recognition target areas, based on a luminance image of one of the captured images;

limiting the candidate set of recognition target areas within a range of threshold values of characteristics in the candidate set of recognition target areas set in advance based on the parallax; and extracting and outputting the one or more recognition targets.

* * * * *